United States Patent [19]

Braun

[11] Patent Number: 4,966,048

[45] Date of Patent: Oct. 30, 1990

[54] MANUAL TRANSMISSION AND SHIFT CONTROL THEREFOR

[75] Inventor: Eugene R. Braun, Royal Oak, Mich.

[73] Assignee: Eaton Corporation, Cleveland, Ohio

[21] Appl. No.: 394,897

[22] Filed: Aug. 17, 1989

[51] Int. Cl.$^5$ ............................................. F16H 3/02
[52] U.S. Cl. .......................................... 74/745; 74/331
[58] Field of Search ................... 74/745, 331, 333, 359, 74/360

[56] References Cited

U.S. PATENT DOCUMENTS

| | | | |
|---|---|---|---|
| 4,409,858 | 10/1983 | Lasoen | 74/360 X |
| 4,788,889 | 12/1988 | Davis et al. | 74/745 |
| 4,856,375 | 8/1989 | Beim | 74/745 |
| 4,901,600 | 2/1990 | Wilson | 74/331 X |

OTHER PUBLICATIONS

"The Spoiler", Spicer Transmission Division, Dana Corp., 7/80, advertisement.
"RT-910 Roadranger", Fuller Transmission Div., Eaton Corp., 1962, advertisement.

Primary Examiner—Dirk Wright
Attorney, Agent, or Firm—H. D. Gordon

[57] ABSTRACT

A compound transmission (10) providing at least sixten forward speed ratios is provided. The transmission includes a two-speed subsplitter input section (12) connected in series with a main transmission section (14) providing at least two forward speeds and one reverse speed ratios, a two-speed splitter section connected in series with the main transmission section and a two-speed range section connected in series with said splitter section. A four-position master control device (100) is provided for operation selection of any one of the four subsplitter/splitter ratios provided by the subsplitter and splitter sections.

20 Claims, 3 Drawing Sheets

| RATIO | M1 | M2 | M3 | SS1 | SS2 | S1 | S2 | R1 | R2 |
|---|---|---|---|---|---|---|---|---|---|
| 1 |  | X |  | X |  | X |  |  | X |
| 2 |  | X |  |  | X | X |  |  | X |
| 3 |  | X |  | X |  |  | X |  | X |
| 4 |  | X |  |  | X |  | X |  | X |
| 5 | X |  |  | X |  | X |  |  | X |
| 6 | X |  |  |  | X | X |  |  | X |
| 7 | X |  |  | X |  |  | X |  | X |
| 8 | X |  |  |  | X |  | X |  | X |
| 9 |  | X |  | X |  | X |  | X |  |
| 10 |  | X |  |  | X | X |  | X |  |
| 11 |  | X |  | X |  |  | X | X |  |
| 12 |  | X |  |  | X |  | X | X |  |
| 13 | X |  |  | X |  | X |  | X |  |
| 14 | X |  |  |  | X | X |  | X |  |
| 15 | X |  |  | X |  |  | X | X |  |
| 16 | X |  |  |  | X |  | X | X |  |
| R1 |  |  | X | X |  | X |  |  | X |
| R2 |  |  | X |  | X | X |  |  | X |
| R3 |  |  | X | X |  |  | X |  | X |
| R4 |  |  | X |  | X |  | X |  | X |

FIG. 3

MANUAL TRANSMISSION AND SHIFT CONTROL THEREFOR

BACKGROUND OF THE INVENTION

1. Field of the Invention

The present invention relates to compound manual transmissions and shift control therefor. In particular, the present invention relates to a manual transmission comprising a two-speed splitter section, a two-speed subsplitter section, and a two-speed range section, all connected in series with a two-forward speed main section, and including a first four-position button type control for selecting the desired splitter/subsplitter ratio combination and a second two-position button type control for selecting the desired range ratio whereby only two lever positions are required to go from start-from-stop to maximum vehicle speed.

2. Description of the Prior Art

Mechanical change gear transmissions, i.e., transmissions providing a plurality of selectable gear ratios between the input and output members thereof, which ratios are selected by the engagement and the disengagement of positive (i.e. jaw type), or predominantly positive clutches, are well known in the prior art.

Compound change gear transmissions of the type having one or more auxiliary sections connected in series with a main transmission section are well known in the prior art. Briefly, by utilizing main and auxiliary sections connected in series, assuming proper sizing of the ratio steps, the total of available transmission ratios is equal to the product of the main and transmission section ratios.

Auxiliary transmission sections are of three general types: range type, splitter type or combined range/splitter type.

In compound transmissions having a range type auxiliary section, the range ratio step or steps are greater than the total ratio coverage of the main transmission section and the main transmission section is shifted progressively through its ratios in each range. Examples of compound transmissions having range type auxiliary sections may be seen by reference to U.S. Pat. Nos. 3,105,395 and 2,637,222, the disclosures of which are hereby incorporated by reference.

In compound transmissions having a splitter type auxiliary section, the ratio steps of the splitter auxiliary section are smaller than the ratio steps of the main transmission section and each main transmission section ratio is split, or subdivided, by a splitter section. In the case of a plurality of splitter auxiliary sections, one of the splitter type auxiliary sections will be a subsplitter type auxiliary section having ratio steps smaller than that in the splitter type auxiliary section and the ratio steps in the splitter type auxiliary section will be split or subdivided by the ratio steps of the subsplitter auxiliary section. Examples of compound change gear transmissions having splitter type auxiliary sections may be seen by reference to U.S. Pat. Nos. 4,290,555; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratio in at least two ranges and also allowing the main section ratios to be split in at least one of the ranges. Examples of compound change gear transmissions having a single combined range/splitter type auxiliary section may be seen by reference to U.S. Pat. Nos. 3,648,546 and 4,754,665 and 4,788,889, the disclosures of which are hereby incorporated by reference.

It should be noted that the terms "main" and "auxiliary sections" are relative in that that the designations of the main and auxiliary sections are reversed, the type of auxiliary section (either range or splitter) would also be reversed. In other words, given what is conventionally considered a four-speed main section with two-speed range type auxiliary section, if the normally designated auxiliary is considered the main section, the normally designated main section would be considered a four-speed splitter type auxiliary section therefor.

By generally accepted transmission industry convention, and as used in this description of the invention, the main transmission section of a compound transmission is that section which usually contained the largest (or at least no less) number of forward speed ratios, which allows selection of the neutral position, which contains the reverse ratio(s) and/or which is shifted (in manual or semi-automatic transmissions) by manipulation of a shift bar or shift rail or shift shaft/shift finger assembly as opposed to master/slave valve/cylinder arrangements or the like.

The use of a two-speed input section for a compound transmission utilizing friction clutch devices having a first and a second selectable position for engaging a selected one of two selectable reduction input ratios, and having a third disengaged position allowing the input section to provide the torque brake function normally provided by a master clutch, is known as may be seen by reference to U.S. Pat. No. 4,831,894, the disclosure of which is hereby incorporated by reference.

While the prior art compound change gear transmissions of the type having both range and splitter type auxiliary section gearing are well received and widely used in manually shifted heavy duty vehicles, these and other types of prior art compound change gear transmissions are not totally satisfactory for all applications as a great deal of skill and attention is required to properly operate same as a significant number of the gear ratio changes require movement of the shift lever and manipulation of the vehicle master clutch as opposed to the relatively easier to accomplish splitter only type shifts.

Additionally, attempts to utilize two or more multiple speed splitter sections in series have required at least partial automation and/or complicated and expensive sequencing devices to assure that the multiplicity of clutches to be engaged and disengaged occurs in an acceptable sequence.

SUMMARY OF THE INVENTION

In accordance with the present invention, the drawbacks of the prior art have been overcome or minimized to the extent that a sixteen forward speed transmission is provided having only two shift lever positions and requiring only three lever movements to shift from the lowest to the highest speed ratios thereof. The transmission of the present invention utilizes all, or predominantly all, mechanical jaw type clutches and requires synchronized clutches for only the double acting range clutch.

The above is accomplished by providing a compound transmission comprising a two-speed subsplitter input section connected in series with a two forward speed and one reverse speed main transmission section which in turn is connected in series with a combined splitter/range type auxiliary section including a two-speed splitter section connected in series with a two-speed range section. A shift lever is provided for manual selection of a neutral position, one of the two selectable forward speed ratios, or the reverse ratio in the main transmission section. A first, four-position master selection device is provided for selection of any one of the four selectable splitter ratios defined by the subsplitter and splitter sections. A second master control device is provided for selecting operation in either the low or high speed range ratio.

Preferably, the input subsplitter section will comprise a friction clutch device having a first and second selectable position for engaging a selected one of the two selectable subsplitter reduction ratios and a third disengaged position allowing the input section to provide the torque break function normally provided by a master clutch. In addition to providing the advantage of eliminating the need for a master clutch, utilizing a friction clutch engagement for the input subsplitter section greatly simplifies the requirement for precise sequencing of the engagement and disengagement of the subsplitter and splitter section clutches as is well known in the prior art, see for example U.S. Pat. No. 4,481,836, the disclosure of which is hereby incorporated by reference.

Accordingly, it is an object of the present invention to provide a more easily controllable manually-controlled compound predominantly mechanical transmission.

This and other objects and advantages of the present invention will become apparent from a reading of the detailed description of the preferred embodiment taken in connection with the attached drawings.

DESCRIPTION OF THE DRAWINGS

FIG. 3 is a chart illustrating the clutch positions for the various selectable ratios of the compound transmission of FIG. 1.

DESCRIPTION OF THE PREFERRED EMBODIMENT

Figure 1:
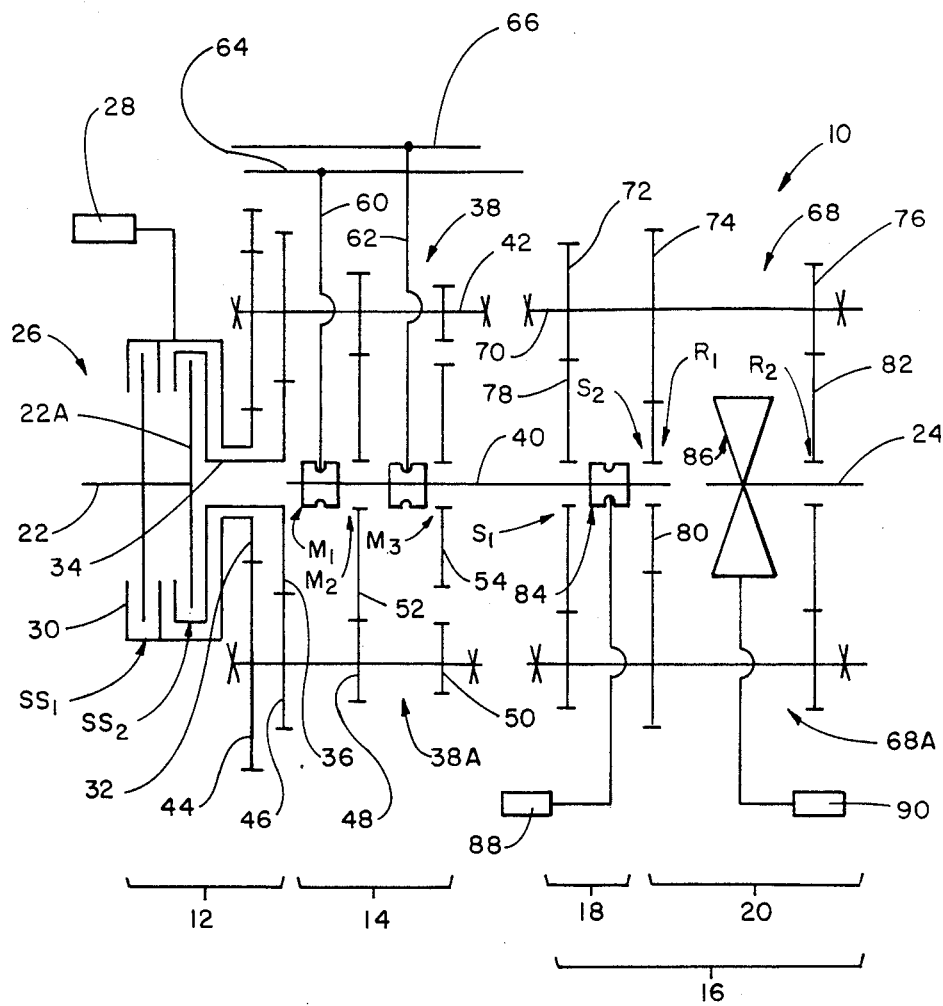
FIG. 1 is a schematic illustration of the compound transmission of present invention.

In the following description of the preferred embodiment, certain terms will be used for convenience in reference only and are not intended to be limiting. The terms "upward", "downward", "rightward" and "leftward" refer to directions in the drawings to which reference is made. The words "forward" and "rearward" will refer respectively to the front and rear ends of the transmission as conventionally mounted in a vehicle being respectfully to the left and right sides of the transmission as illustrated in FIG. 1. The words "inwardly" and "outwardly" will refer to directions toward and away from, respectively, the geometric center of the device and/or designated Parts thereof. Such termination includes the words above specifically mentioned, derivatives thereof and words of similar import.

The term "compound transmission" is used to designate a change speed or change gear transmission having a main transmission section and one or more of auxiliary transmission sections connected to a series whereby the selected gear reduction in the main transmission section may be compounded by further selected gear reduction in the auxiliary transmission sections. The term "upshift" as used herein shall mean the shifting from a lower speed gear ratio to a higher speed gear ratio and the term "downshift" as used herein shall mean the shifting from a higher speed gear ratio to a lower speed gear ratio. "Synchronized clutch assembly" and words of similar import shall designate a clutch assembly utilized to non-rotatably couple a selected gear to a shaft by means of a positive clutch in which attempted engagement of such clutch is prevented or blocked until the members of the clutch are at a substantially synchronous rotation and a relatively large capacity friction means are associated with the clutch members and are sufficient, upon initiation of a clutch engagement, to cause the clutch members and all members rotating therewith to rotate at a substantially synchronous speed.

Referring now to FIG. 1, there is schematically illustrated a sixteen-forward speed, four-reverse speed, compound manually operated transmission 10. Compound transmission 10 includes a two-speed input subsplitter section 12, a main transmission section 14 and a four-speed combined splitter/range type auxiliary section 16 which includes a splitter section 18 and a range section 20, all connected in series. Typically, transmission 10 is housed within a single housing (not shown) and includes an input shaft 22 driven by a prime mover (not shown) such as a well known diesel engine or the like. As will be described in greater detail below, in the illustrated preferred embodiment in FIG. 1, the input shaft 22 is directly mechanically connected to the vehicular prime mover without requiring a master clutch or the like. The combined splitter/range auxiliary section 16 supports an output shaft 24 for driving connection to the vehicular final drive mechanisms such as transfer cases, drive axle assemblies or the like.

In the subsplitter input section 12, the input shaft 22 drives the input members 22A of three position friction clutch assembly 26. Friction clutch assembly 26 is actuated by an actuator 28, such as a three-position piston, or the like, and has a first position for frictionally coupling shroud member 30 and splitter input gear 32 to the input shaft 22, a second position for frictionally coupling inner shroud member 34 and subsplitter input gear 36 to the input shaft 22 and a third position wherein the subsplitter/input gears 32 and 36 are drivingly disconnected from the input shaft 22. Input sections of this general type may be seen in greater detail by reference to above-mentioned U.S. Pat. No. 4,831,894, the disclosure of which is hereby incorporated by reference. The subsplitter/input section 12 thus defines a first clutch SS1 and a second clutch SS2 which are mutually exclusively engageable to couple input/subsplitter gear 32 or 36, respectively, to the input shaft 22.

The subsplitter/input gears 32 and 36 simultaneously drive a pair of substantially identical main section countershaft assemblies 38 and 38A at substantially identical rotational speeds. In the transmission illustrated, two substantially identical main section countershaft assemblies are provided on diametrically sides of a main shaft 40 which main shaft 40 is generally coaxially aligned with the input shaft 22 and output shaft 24. Each of the main section countershaft assemblies 38 and 38A, comprise a main section countershaft 42 supported by bearings and provided with an identical grouping of main section countershaft gears 44, 46, 48 and 50, fixed for rotation therewith. Main section drive gears 52 and 54 surround the main shaft 40 and are selectively clutchable, one at a time, to the main shaft 40 for rotation therewith by sliding clutch collars 56 and 58 as is well known in the prior art. Clutch collar 56 may also be utilized to clutch input gear 36 directly to mainshaft 40 to provide a direct driving relationship therebetween. Of course, with clutch SS2 engaged, input gear 36 will rotate with input shaft 22.

Main section drive gear 52 is in continuous meshing engagement with and is floatingly supported by the associated main section countershaft gears 48 and main section main shaft gear 54 is the reverse gear and is in continuous meshing engagement with countershaft gear 50 by means of conventional intermediate idler gears (not shown), which mounting means and the special advantages resulting therefrom are explained in greater detail in U.S. Pat. Nos. 3,105,395 and 3,335,616, the disclosures of which are hereby incorporated by reference.

Main section clutch collars 56 and 58 are axially positioned by shift forks 60 and 62, respectively, which are axially positioned by shift rail 64 and 66, respectively, typically manually controlled by means of a shift lever or the like. The clutch collars 56 and 58 are of the well known nonsynchronizing type and clutch collar 56 is of the well known double acting jaw clutch type.

It may be seen, that the manually controlled main section 14 defines three clutches M1, M2 and M3, respectively, which are mutually exclusively engageable to drivingly couple either input/subsplitter gear 36, main section drive gear 52, or reverse main section drive gear 54, respectively, to the main shaft 40.

The combined splitter/range auxiliary section 16 includes two substantially identical countershaft assemblies 68 and 68A, each comprising an auxiliary countershaft 70 supported by bearings in a housing and carrying three auxiliary section countershaft gears 72, 74 and 76 fixed for rotation therewith. Auxiliary section countershaft gears 72 and constantly meshed with in support of auxiliary section splitter gear 78 surrounds the mainshaft 40. Auxiliary countershaft gears 74 are constantly meshed with and support auxiliary section splitter/range gear 80 which surrounds the main shaft 40 at the end thereof adjacent the coaxial end of output shaft 24. Auxiliary section countershaft gears 76 constantly mesh and sup port auxiliary section range gear 82 which surrounds the output shaft 24.

A sliding two-position jaw clutch collar 84 is utilized to selectively couple either the splitter gear 78 or the splitter/range gear 80 to the mainshaft 40, while a two-position synchronized clutch assembly 86 is utilized to selectively couple the splitter/range gear 80 or the range gear 82 to the output shaft 24. The structure and function of double acting jaw clutch collar 84 is substantially identical to that of jaw clutch collar 56 while the structure and function of the double acting synchronized jaw clutch 86 is of the well known type, examples of which may be seen by reference to U.S. Pat. Nos. 4,462,489; 4,125,179 and 2,667,995, the disclosure of which are hereby incorporated by reference.

The detailed structure and function of combined splitter/range type auxiliary section 16 is known in the prior art and may be appreciated in greater detail by reference to above-mentioned U.S. Pat. No. 4,754,665. The combined auxiliary section 16 may be considered as comprising a splitter section 18 connected in series with a range section 20. The splitter section 18 defines two mutually exclusively engageable clutches S1 and S2, respectively, for engagement of either splitter gear 78 or splitter/range gear 80 to the main shaft 40. The range section 20 defines two mutually exclusively engageable range clutches R1 and R2, respectively, which are engageable to couple either splitter/range gear 80 or range gear 82, respectively to the output shaft 24. Actuators 88 and 90, respectively, which may be two-position fluid actuated pistons, are provided to position the clutch members 84 and 86, respectively, in either their rightwardmost or leftwardmost positions.

In accordance with established gear ratio selection principles, the splitter step should be generally equal to the square root of the main section ratio step or steps, the range section step should equal about the main section ratio step raised to the Nth power where N=the number of main section ratio steps occurring in all of the ranges (i.e. N =2 in transmission 10). The subsplitter ratio step should be generally equal to the square root of the splitter ratio step. Given the desired ideal ratios, gearing to approximate these ratios is selected.

Figure 2:
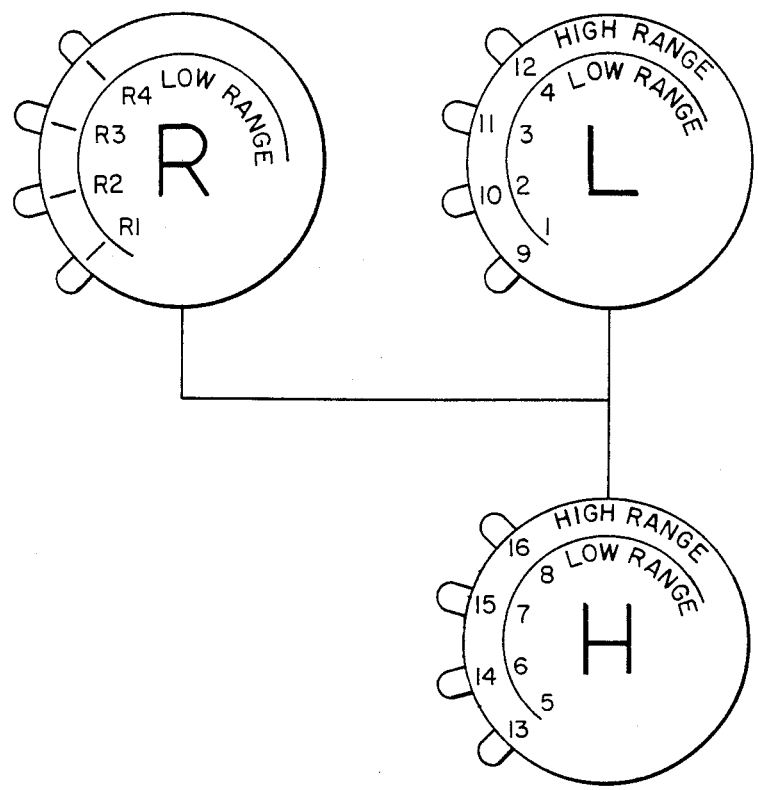
FIG. 2 is a schematic illustration of the shift pattern for manually controlling transmission of FIG. 1.

While the range clutch assembly 86 should be a synchronized double acting clutch assembly, a splitter clutch 84 is not required to be synchronized. The shift pattern for manually shifting transmission 10 is schematically illustrated in FIG. 2 with locations 94, 96 and 98 representing the required shift lever positions for causing engagement of clutches M2, M1 and M3, respectively. A first master control member, preferably in the form of a master valve as is known in the prior art, is controlled by a detented button 100 which may assume one of four selectable positions 100A, 100B, 100C, or 100D. These four positions of button 100 represent the four selectable ratios provided by the combined subsplitter section 12 and splitter section 18. Selection of position 100A will cause clutches SS1 and S1 to be engaged, selection of position 100B will cause clutches SS2 and S1 to be engaged, selection of position 100C will cause clutches SS1 and S2 to be engaged and selection of position 100D will cause clutches SS2 and S2 to be engaged. The master control will operate through mechanical/electrical/fluid means to control the actuators 28 and 88 as required. As discussed above, the requirement for maintaining precise sequencing of the engagement and disengagement of the subsplitter and splitter clutches is minimized by the utilization in the preferred embodiment of the friction clutch assembly 26. A second two-position master control member, such as a switch or button, is provided to select operation in the high or low range and to cause the remote slave actuator 90 to position the synchronized clutch assembly 86 as is well known in the prior art.

The condition of the main section clutches M1, M2 and M3; the subsplitter clutches SS1 and SS2; the splitter clutches S1 and S2; and the range clutches R1 and R2 for each of the selectable sixteen forward speeds and four reverse speeds of transmission 10 may be seen by reference to FIG. 3. As may be seen, operation of transmission 10 from the lowest speed ratio, first speed, to the highest speed ratio, sixteen speed, requires only three movements of the shift lever and then to only one of two positions. The preponderance of shifting is accomplished by utilization of the first master selector device 100 and, is often accomplished by merely preselecting a subsplitter/splitter shift then varying the fuel supply to the engine to cause a torque break for disengaging the existing and preselecting the desired ratio and then substantial crossing of synchronization without requiring operation of the master clutch pedal which will also serve to operate friction clutch assembly 26 to place it in its fully disengaged position thereof. The operator is not required to operate the clutch pedal for sequential subsplitter/splitter shifts not requiring a shift in the main 14 or the range 20 sections as each such sequential shift involves a shifting of the input section friction clutch assembly 26 during which time for a period of time the friction clutch assembly 26 will be in the disengaged position thereof.

Accordingly, it may be seen that an improved compound manually shifted transmission providing relatively easy shifting, the preponderance of which is splitter type shifting is provided.

The description of the preferred embodiment of the present invention is by way of example only and various modifications and/or rearrangement of parts are contemplated without departing from the spirit and the scope of the invention as hereinafter claimed.

I claim:

1. A compound vehicular transmission providing at least sixteen forward speeds comprising:
   a two-speed subsplitter input section (12);
   a main transmission section (14) providing at least two forward speeds and one reverse speed connected in series with said input section;
   a two-sPeed splitter section (18) connected in series with said main transmission section; and
   a two-speed range section (20) connected in series with said splitter section.

2. The transmission of claim 1 wherein said two-speed subsplitter input section (12) utilizes a friction clutch device (26) having a first and second selectable position for frictionally engaging a selected one of two selectable subsplitter reduction input ratios and a third disengaged position allowing the input section to provide the torque break function between the transmission input and the vehicular prime mover.

3. The transmission of claim 1 wherein said two-speed subsplitter input transmission section (12) comprises an input shaft (22) nondisengagably mechanically drivingly connected to said vehicular prime mover, a first subsplitter input gear 32 and a second subsplitter input gear 34 coaxial with and rotatable relative to said input shaft, a countershaft assembly (38) comprising a countershaft (42) having a first countershaft gear (44) fixed for rotation therewith and a second countershaft gear (46) fixed for rotation therewith, said first countershaft gear constantly meshed with said first input gear and said second countershaft gear constantly meshed with said second input gear, and a three-position friction clutch assembly (26) having a first position for coupling said first input gear to said input shaft, a second position for coupling said second input gear to said input shaft and a third position allowing independent rotation of said input shaft, said first input gear and said second input gear.

4. The transmission of claim 1 wherein said two-speed sPlitter section (18) and said two-speed range section (20) comprise a three layer combined splitter/range type auxiliary section (16).

5. The transmission of claim 2 wherein said two-speed splitter section (18) and said two-speed range section (20) comprise a three layer combined splitter/range type auxiliary section (16).

6. The transmission of claim 3 wherein said two-speed splitter section (18) and said two-speed range section (20) comprise a three layer combined splitter/range type auxiliary section (16).

7. The transmission of claims 1, 2, 3, 4, 5 or 6 wherein said main section defines an average ratio step between the forward speed ratios thereof, said splitter section defines a splitter ratio generally equal to the square root of said main section ratio step, said range section defines a range ratio step generally equal to said main section ratio step raised to the Nth power where N equals the number of main section ratio steps occurring in all ranges, and said subsplitter section defines a subsplitter ratio step equal to about the square root of said splitter ratio step.

8. The transmission of claims 1, 2, 3, 4, 5 or 6 further comprising a first master control (100) having four selectable positions (100A, 100B, 100C and 100D) allowing operator selection of any one of the four ratios defined by said subsplitter and splitter auxiliary transmission sections.

9. The transmission of claim 7 further comPrising a first master control (100) having four selectable p ositions (100A, 100B, 100C and 100D) allowing operator selection of any one of the four ratios defined by said subsplitter and splitter auxiliary transmission sections.

10. The transmission of claim 8 wherein said first master selector means comprises a selector member moveable to any one of the four positions thereof and further comprising slave actuator means (28, 88) for actuating said subsplitter and splitter sections in response to the position of said first master control means.

11. The transmission of claim 9 wherein said first master selector means comprises a selector member moveable to any one of the four positions thereof and further comprising slave actuator means (28, 88) for actuating said subsplitter and splitter sections in response to the position of said first master control means.

12. The transmission of claim 8 further comprising second master control means having two selectable positions allowing selection of either selectable one of said range section ratios.

13. The transmission of claim 9 further comprising second master control means having two selectable positions allowing selection of either selectable one of said range section ratios.

14. The transmission of claim 10 further comprising second master control means having two selectable positions allowing selection of either selectable one of said range section ratios.

15. The transmission of claim 8 wherein said main section comprises at least one jaw clutch member (56, 58) manually positioned by means of shift forks (60, 62) controlled by a shift lever.

16. The transmission of claim 9 wherein said main section comprises at least one jaw clutch member (56, 58) manually positioned by means of shift forks (60, 62) controlled by a shift lever.

17. The transmission of claim 10 wherein said main section comprises at least one jaw clutch member (56, 58) manually positioned by means of shift forks (60, 62) controlled by a shift lever.

18. The transmission of claim 15 wherein said first master control mechanism is mounted on said shift lever.

19. The transmission of claim 16 wherein said first master control mechanism is mounted on said shift lever.

20. The transmission of claim 17 wherein said first master control mechanism is mounted on said shift lever.

* * * * *